Patented May 26, 1936

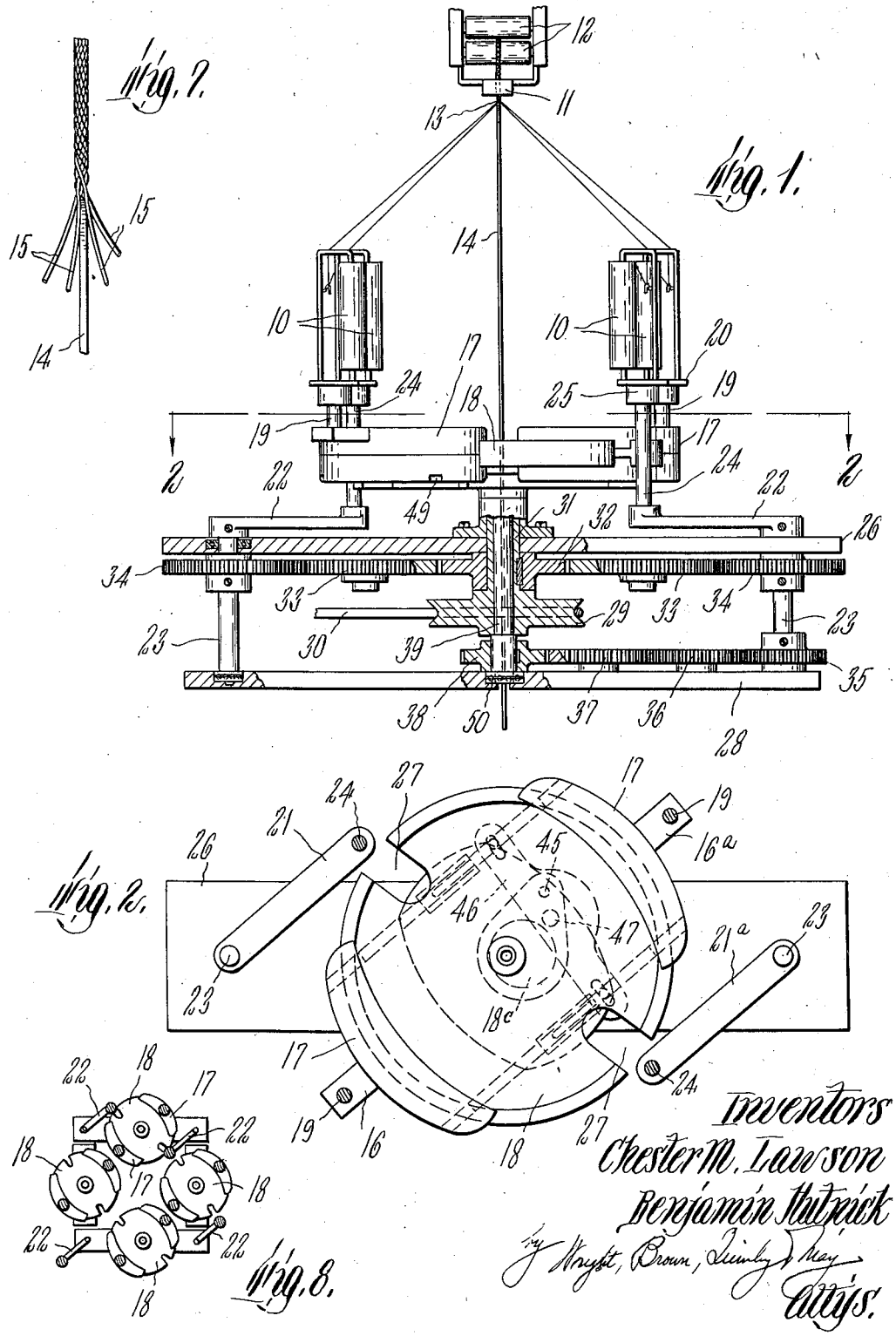

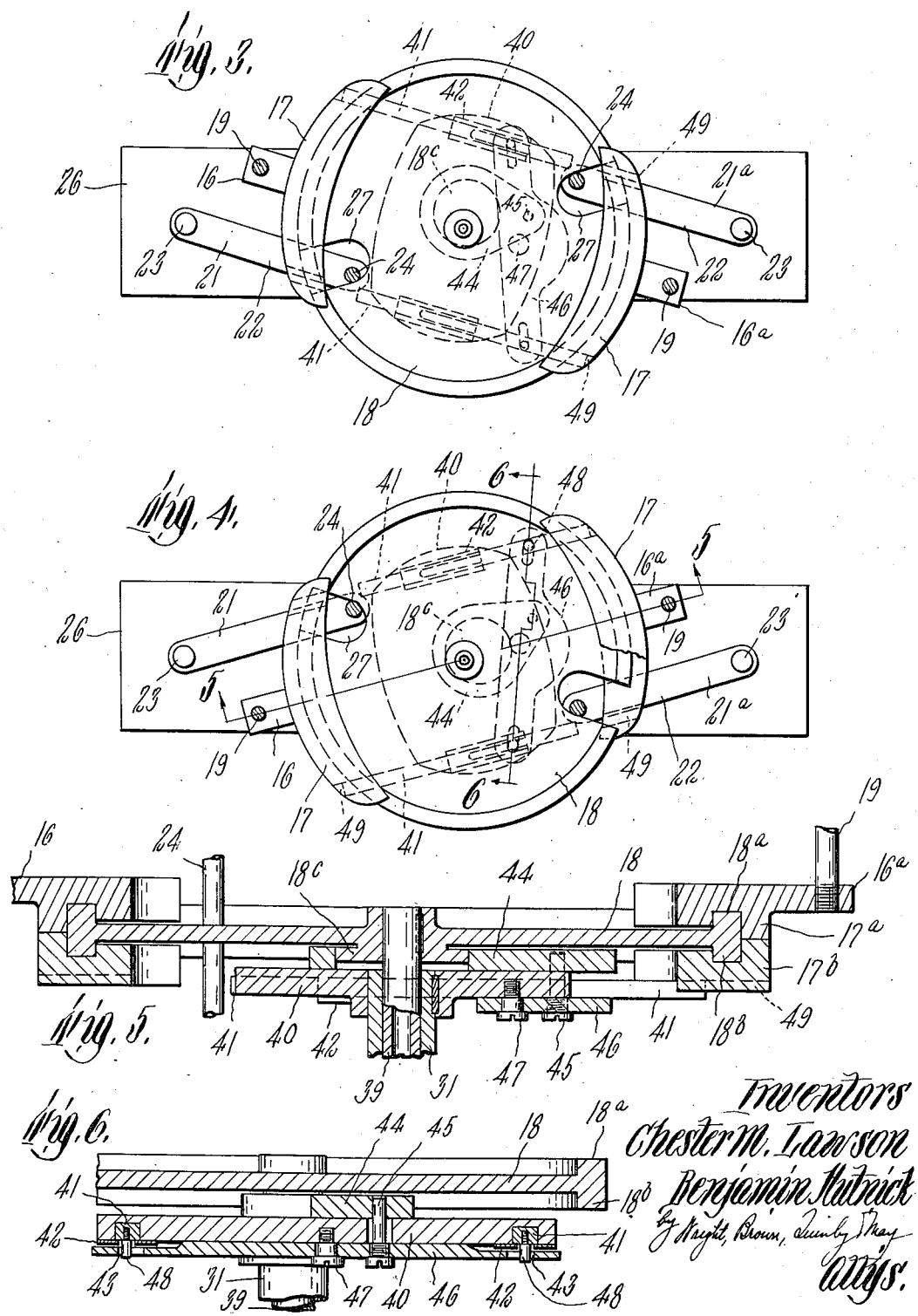

2,042,065

UNITED STATES PATENT OFFICE 2,042,065

BRAIDING MACHINE

Chester M. Lawson, Lynnfield, and Benjamin Hutnick, Malden, Mass.

Application February 5, 1935, Serial No. 5,038

7 Claims. (Cl. 96—3)

This invention relates to a braiding machine for braiding a plurality of strands continuously into flat, tubular, or other desired forms as they are being drawn upwardly in converging relationship from a plurality of spools or their equivalents. The braiding machine of the present invention is of compact, inexpensive and sturdy construction; is capable of running at high speed with little noise and with a large output of work; can be readily compounded and coordinated with the parts of one or more similar machines into a multiple machine; and is especially adapted to braid a plurality of strands about a core strand.

The braiding machine of the present invention comprises a plurality of independent inner spool carriers each movable in a fixed common inner circular path and a plurality of independent outer spool carriers movable in separate fixed outer circular paths intersecting the fixed inner circular path. The spools of all the carriers are arranged approximately on the same level or plane and, as the strands are withdrawn therefrom upwardly in converging relationship, all of the inner spool carriers are caused to move continuously and simultaneously in one direction in their inner circular path and all of the outer spool carriers are caused to move continuously and simultaneously in the same circular direction in their outer circular paths and in such timed relation to the inner spool carriers that the outer and inner carriers cross one another in each of their revolutions, in consequence of which the desired interlocking or intertwisting of the strands into a braided fabric is effected. The movement of the inner spool carriers is effected by a rotary member located within the inner circular path traversed by such inner carriers. In the course of rotation of such rotary member, it successively engages and disengages each inner carrier at a plurality of points, but it is constantly engaged with each inner carrier at least at one point. When such rotary member disengages an inner carrier, a gap is created locally therebetween; and the movement of an outer carrier is so timed with that of an inner carrier that it passes through the successive local gaps created between such rotary member and an inner carrier. Each inner carrier also includes a block support slidably engaged on the periphery of a rotary disc which defines the path of movement of such inner carrier. The periphery of the disc is recessed to receive therein the outer carriers and the disc is rotated in a direction opposite to that of an outer carrier and in such timed relation thereto that an outer carrier is received in a recess as it passes through the gaps successively created between an inner carrier and the rotary member.

With the foregoing and other features and objects in view, the present invention will now be described with particular reference to the accompanying drawings wherein,—

Figure 1 is a front elevation, partly in section, of a braiding machine embodying the present invention.

Figure 2 is a plan view of the unit, partly in section, on the line 2—2 of Figure 1, showing the outer carriers after they have crossed the inner carriers and are just emerging from the recesses in the disc for guiding the inner carriers.

Figure 3 is a view similar to Figure 2 but showing the outer carriers shortly before they have crossed the inner carriers and immediately after they have entered into the recesses in the disc.

Figure 4 is a view similar to Figure 3 but showing the outer carriers immediately after they have crossed the inner carriers but are still in the recesses in the disc.

Figure 5 is a greatly enlarged section on the line 5—5 of Figure 4.

Figure 6 is also a greatly enlarged section on the line 6—6 of Figure 4.

Figure 7 depicts a core covered by braided fabric produced by the braiding machine of the present invention.

Figure 8 illustrates diagrammatically and conventionally a multiple machine adapted for producing tubular braided fabric.

Referring first to Figure 1, it will be observed that the machine therein shown comprises four spool carriers whose spools of thread 10 are on approximately the same level or plane and deliver their threads in converging relationship upwardly through an apertured guide 11 and thence into the nip of a pair of feed rolls 12. Braiding of the threads takes place at a point 13 just below the guide 11, the rolls 12 being rotated by suitable means (not shown) at a rate of speed designed to deliver a fabric of the desired tightness or closeness of braided texture. The machine is shown as being supplied with a core strand 14 about which the strands supplied from the spools 10 may be braided. If desired, the core strand may be elastic rubber thread, whereas the braided outer ones may be fibrous. The composite strand as taken from the feed rolls 12 appears in Figure 7 and is made up of the core strand 14 and quadruplicate strands 15 braided thereabout. When the core strand is elastic rubber thread and such thread is covered by braided fibrous threads, the composite strand is elastic and can be used in making elastic woven or knitted fabrics. Of course, the composite strand may be one whose core strand is wire and whose braided sheathing strands are wire, fibrous thread, etc.

The machine of the present invention includes a pair of independent inner spool carriers indicated generally at 16 and 16a. Each carrier includes an arcuate block support 17 of considerable length slidably engaged on the periphery of a horizontal disc 18, the support for one carrier being stationed diametrically opposite to that of the other. As best shown in Figure 5, the peripheral or rim portion of the disc 18 is equipped with an upper peripheral bearing and guide ring 18a and a lower peripheral bearing and guide ring 18b. Each block support 17 is formed as two parts, namely, an upper part 17a engaging over the guide ring 18a and a lower part 17b engaging over the lower guide ring 18b, the two parts being suitably fastened together. Each block support is thus fastened to the disc 18 but the disc is freely rotatable in a direction opposite to the movement imparted to the support. The upper piece 17a of the support has upstanding therefrom a spindle 19 provided with a platform 20 on which stands a spool 10. The spindle 19 and the platform 20 are, of course, part of each inner spool carrier. As will hereinafter appear, the disc 18 is rotated in one direction while the spool carriers 17 engaged thereon are caused to move in an opposite direction.

The machine also comprises a pair of independent outer spool carriers, such carriers being indicated generally as 21 and 21a. Each outer spool carrier includes a horizontal crank arm 22, the inner end portion of which is fixed to the upper end of a vertical shaft 23 and the outer end portion of which carries an upstanding spindle 24 provided with a platform 25 on which stands a spool 10, as best shown in Figure 1. The spindle 24 and the platform 25 are, of course, part of each outer spool carrier. One outer spool carrier 21 is on one side of the disc 18 and the other outer spool carrier 21a on the opposite side of the disc. Although each shaft 23 is well outside the periphery of the disc 18, passing up through an upper horizontal support 26 to rotate the crank arm 22, yet the spindle 24 carried by the outer end portion of the crank 22 moves in an orbit or circular path within the peripheral edge or rim of the disc, wherefore, provision must be made for receiving each spindle 24 within the disc. To this end, the disc has on opposite sides thereof a recess 27 extending inwardly from its periphery, the rotation of each crank 22 being in a direction opposite to that of the disc and being so timed with relation to the disc that each outer spindle 24 and the outer spool carried thereby enters into a recess 27 and moves across or past the inner face of an arcuate block support 17 and the inner spool carried thereby, gaps between such support and a rotary driving member 40 therefor, whose axis of rotation is concentric with that of the disc, being created to permit such movement of each outer spindle 24, as will hereinafter appear.

Provision is made to drive or rotate the various spool carriers and the disc 18 from a single source of power. The driving mechanism, which is shown in Figure 1 as being located largely in between the upper horizontal support 26 and a lower horizontal support 28, includes a driving pulley 29 to which rotation is imparted by a belt 30 from an electric motor or other suitable source of power (not shown). Extending from and integral with the upper end of the pulley is a hollow shaft 31 which passes upwardly through the support 26 and terminates somewhat below the disc 18, as shown in Figure 5. Keyed to the shaft 31 in between the support 26 and the upper face of the pulley 29 is a gear 32 meshing on each side with an idler gear 33 which in turn meshes with a gear 34 affixed to each crank shaft 23. Each crank 22 is thus caused to rotate in the same direction as the other. One of the crank shafts 23 has a gear 35 affixed thereto just above the lower support 28, which latter gear, through successive idler gears 36 and 37, imparts rotation to a gear 38 located in between the lower face of the pulley 29 and the lower support 28. The gear 38 is fixed to a second hollow shaft 39 passing up through the pulley 29 and the hollow of the shaft 31 to the disc 18, which latter is keyed thereto, as best shown in Figure 5. It is thus seen that the disc 18 is caused to rotate in a direction opposite to that of the cranks 22.

Keyed to the upper end of the shaft 31 is a rotary member 40 whose peripheral edge describes a path well within that of the inner spool carriers 16, including the block supports 17, but which has fixed therein for reciprocatory or sliding motion a pair of fingers or bars 41 at least one of which constantly engages in one of the block supports 17 to cause rotative movement of the latter. As best shown in Figure 6, each finger 41 is fitted into a recess in the rotary member 40 adjacent to a side edge of such member, the recess extending upwardly from the lower face of such member. As shown, the recess is of rectangular form and the finger 41 is complemental thereto, being held from downward movement by a pair of longitudinal strips 42 engaging over its lower face and defining a longitudinal clearance 43 between them. Reciprocation of the fingers 41 is effected by an eccentric arm 44 which, as shown in Figure 5, is fixed to a lower hub portion 18c of the disc 18 in between the lower face of such disc and the upper face of the rotary member 40. The eccentric arm 44 actuates an eccentric pin 45 which is pivoted therein and which passes loosely down through the rotary member 40 to a double-acting rocker 46 to which it is also pivotally secured. The double-acting rocker 46 is fulcrumed by a pivot pin 47 adjacent to the lower face of the rotary member 40 to which such pin is secured; and each of the oppositely extending arms of the rocker is fixed at its end portion to a finger 41 by a pin 48 whose head portion passes freely down through the clearance 43 and projects loosely through an elongated slot 49 in such end portion. The action of the eccentric 44 as it rotates in a direction opposite to that of the rotary member 40 is to cause the double acting rocker 46 to reciprocate the fingers 41 in their slots in the rotary member and to cause their end portions to engage and disengage successively the block supports 17. To this end, the lower part 17b of each block support is provided at its lower face and near each end thereof with a recess 49 into which the end portion of a finger 41 may be projected so as to engage the block support and cause the desired rotational movement of the latter.

The action of the machine and the timing of movement of its parts may be best understood by considering Figures 2, 3 and 4, which show different positions of the various spool carriers and the disc 18 as the machine is being operated. It will be observed that in Figure 2, the pair of outer spool carriers 21 and their spools have just passed out of the recesses 27 in the disc 18, and that the opposite end portions of the pair of fingers 41 are still engaged in the slots 49 in opposite end portions of the opposite block supports 17. In this connection, it is well again to observe that at least one end portion of a pin 41 is constantly in engagement with a block support so that both block supports have continuous rotational movement. It will be observed that in Figure 3, the left-hand outer spool spindle 24 has been received in one of the disc recesses 27 and has passed beyond the adjacent end of the lower finger 41 which has been retracted by the action of the rocker 46 so that its opposite end portion is engaging in the right-hand block support 17. However, at the same time, the upper finger 41 is shown in Figure 3 as being in engagement with the upper end portion of the left-hand block support 17, having been retracted by the action of the rocker 46 sufficiently to permit the right-hand outer spool spindle 24 to clear past its right-hand end. Figure 4 shows the left-hand outer spool spindle 24 as it is clearing the left-hand end of the upper finger 41 and the right hand outer spool spindle 24 as it is clearing the right-hand end of the lower finger 41, at which time the upper finger 41 is engaging the upper end portion of the right-hand block support and the lower finger 41 is engaging the lower end portion of the left-hand block support. It is thus seen that the rates of rotations of the cranks 22, the disc 18 and the rotary member 40 are so timed with relation to each other that each outer spindle 24 enters into a recess 27 in the disc 18 and remains therein as it passes by one end portion of a block support while one finger 41 has been retracted sufficiently to form the desired gap through which it can pass, crosses an inner spool spindle 19, and passes by the other end portion of the same block while the other finger 41 has been retracted to form the desired gap through which it can pass. The rates of rotation of the inner carriers and the outer carriers are such that each inner carrier and each outer carrier cross each other in each of their revolutions. This means that thread from each inner spool is caused to interlock with the thread of an outer spool and the threads from both inner spools caused to interlock, since each inner spool crosses an outer spool in every revolution of its carrier and the threads of both inner spools are caused to intertwist during each revolution thereof. As already indicated, the inner shaft 39 is hollow and the lower support 28 and the step bearing 50 shown therein below the gear 38 may be apertured to permit a core strand to be fed continuously up through such shaft and out through a disc 18 to the guide 11 so that braiding of the threads from the spools 10 may take place about such core strand.

As illustrated in Figure 8, it is possible to build a braiding machine by compounding a number of inner and outer spool carriers, as desired. Thus, the machine of Figure 8 comprises a rectangular array of four discs 18, each of which serves as the guide for a pair of inner spool carriers 16 but comprises only four outer spool carriers 22. In other words, only one outer spool carrier 22 may be arranged to coact with two adjacent discs 18 and their inner spool carriers. The particular array shown in Figure 8 is for producing a tubular fabric, but it is obvious that flat or semi-tubular braided fabrics may be produced by other suitable arrangements of the braiding units.

We claim:—

1. In a braiding machine, a rotary disc provided with recesses extending inwardly from its periphery, inner spool carriers arranged on opposite sides of said disc and each slidably engaged over part of its peripheral portion, means on said disc for guiding said carriers in a fixed circular path on said disc, a rotary member whose axis of rotation is coincidental with that of said disc and having a plurality of fingers successively engageable in and disengageable from said carriers but at least one of which is constantly engaged with each of said carriers, means for rotating said member in one direction to cause movement of said carriers in their fixed circular path on said disc, means for actuating said fingers during the rotation of said member to cause them successively to engage and disengage each carrier, disengagement creating a local gap between the carrier and said member, means for rotating said disc in a direction opposite to that of said member, outer spool spindles movable in separate fixed outer circular paths intersecting said fixed inner circular path, and means for causing each of said outer spool spindles to move in its outer path and in such timed relation to said disc and said fingers as to cause each outer spool spindle to enter into a disc recess and pass through the local gaps created between said carrier and said member across the inner side of an inner carrier in each revolution of an inner carrier.

2. In a braiding machine, a rotary disc provided with recesses extending inwardly from its periphery, inner spool carriers arranged on opposite sides of said disc and sildably engaged over part of its peripheral portion, means on said disc for guiding said carriers in a fixed circular path on said disc, a rotary member whose axis of rotation is coincidental with that of said disc and having a plurality of fingers engageable with and disengageable from said carriers but at least one of which is constantly engaged with each of said carriers, disengagement of a finger from a carrier creating a local gap therebetween, means for rotating said member, means for actuating said fingers during the rotation of said members to cause them successively to engage and disengage each carrier, outer spool spindles movable in separate fixed outer paths intersecting said fixed inner circular path of said inner carriers, means for rotating said disc in a direction opposite to that of said member, and means for continuously moving outer spool spindles in a direction opposite to that of said disc and in such timed relation to said disc and said fingers as to cause each outer spool spindle to enter into a recess in said disc and to move through the gaps created between said member and an outer carrier across the inner side of an inner carrier in each revolution of an inner carrier.

3. In a braiding machine, a horizontal rotary disc provided with recesses extending inwardly from its periphery, inner spool carriers arranged on opposite sides of said disc and each slidably engaged over part of its peripheral portion, means on said disc for guiding each carrier in a fixed circular path on said disc, a horizontal rotary member whose axis of rotation is coincidental with that of said disc and successively engageable with and disengageable from each carrier at a plurality of points but which is constantly engaged with each carrier at least at one point, outer vertical spool spindles arranged on opposite sides of said disc and each rotatable about an axis outside of the path of said disc periphery and in an outer fixed path intersecting that of said disc periphery, means for rotating said disc, means for rotating said member in an opposite direction, means for rotating each of said spool spindles in such timed relation to said disc as to cause each spindle to enter into a recess in said disc and move across the inner side of an inner carrier, and means for disengaging the rotary member from each inner carrier sequentially at said various points to permit each outer spool spindle to move across the inner side of an inner carrier.

4. In a braiding machine, a rotary disc provided with recesses extending inwardly from its periphery, a pair of inner spool carriers arranged on opposite sides of said disc and each slidably engaged on its peripheral portion over a substantial arc, means on said disc for guiding said carriers in a fixed circular path on said disc, a plurality of rotary fingers extending outwardly from an axis of rotation coincident with that of said disc and at least two being engageable with each carrier at spaced points in said arc, means for rotating said disc, means for rotating said fingers in an opposite direction to move said carriers in their fixed circular path on said disc, means for repeatedly disengaging one of said fingers from a carrier while maintaining another engaged with said carrier, thereby creating a gap between said carrier and said disengaged finger, outer spool carriers movable in separate fixed outer paths intersecting said fixed inner circular path, and means for continuously moving each outer carrier in such timed relation to said disc and said fingers that each said outer carrier is received in a disc recess and passes through the gaps successively created between an inner carrier and said fingers across the inner side of an inner carrier in each revolution of an inner carrier.

5. In a braiding machine, a rotary disc provided with recesses extending inwardly from its periphery, a pair of inner spool carriers arranged on opposite sides of said disc and each slidably engaged on its peripheral portion over a substantial arc, means on said disc for guiding said carriers in a fixed circular path on said disc, a plurality of rotary fingers extending outwardly from an axis of rotation coincident with that of said disc and at least two being engageable with each carrier at spaced points in said arc, means for rotating said disc, means for rotating said fingers in an opposite direction to move said carriers in their fixed circular path on said disc, means for repeatedly disengaging one of said fingers from a carrier while maintaining another engaged with said carrier, thereby creating a gap between said carrier and said disengaged finger, a pair of outer spool spindles arranged on opposite sides of said disc, a rotatable crank carrying each said spindle, the axis of rotation of each crank being outside of said disc and rotation of each crank causing its spindle to intersect the fixed circular path of an inner carrier, and means for rotating said cranks in a direction opposite to that of said disc and at such timed relation to said disc and said fingers that each said outer spool spindles is received in a disc recess and passes through the gaps successively created between an inner carrier and said fingers across the inner side of an inner carrier in each revolution of an inner carrier.

6. In a braiding machine, a rotary disc provided with recesses extending inwardly from its periphery, a pair of inner spool carriers arranged on opposite sides of said disc and each slidably engaged over part of its peripheral portion, means on said disc for guiding said carriers in a fixed circular path on said disc, a pair of outer spool spindles arranged on opposite sides of said disc, a rotatable crank carrying each said spindle, the axis of rotation of each crank being outside of said disc and rotation of each said crank causing its spindle to intersect the fixed circular path of an inner carrier, means for continuously moving said inner carriers in their fixed circular path on said disc, and means for rotating said cranks in a direction opposite to that of said disc and in such timed relation to said disc as to cause each spindle to move into a disc recess and to cross the inner side of an inner carrier in each revolution of an inner carrier.

7. In a braiding machine, a rotary disc provided with recesses extending inwardly from its periphery, a pair of inner spool carriers arranged on opposite sides of said disc and each slidably engaged over part of its peripheral portion, means on said disc for guiding said carriers in a fixed circular path on said disc, a pair of outer spool spindles arranged on opposite sides of said disc and movable in separate fixed outer circular paths intersecting said fixed inner circular path, a rotary member arranged inwardly of said carriers and provided with a plurality of fingers engageable with and disengageable from each carrier but at least one of which is constantly engaged with each carrier, means for rotating said member to cause movement of said carriers in their fixed circular path on said disc, means for actuating said fingers during the rotation of said member to cause them to successively engage and disengage each carrier, disengagement creating a local gap between a carrier and said member, means for rotating said disc in a direction opposite to that of said member, and means for moving each of said spool spindles in its fixed outer circular path in a direction opposite to that of said disc and in such timed relation to said disc and said member to cause each spindle to move into a disc recess and through the local gaps created between said carrier and said member across the inner side of an inner carrier in each revolution of an inner carrier.

CHESTER M. LAWSON.
BENJAMIN HUTNICK.